Dec. 16, 1947.  R. D. BEASON  2,432,496
SANITARY NURSING CONTAINER
Filed June 15, 1945
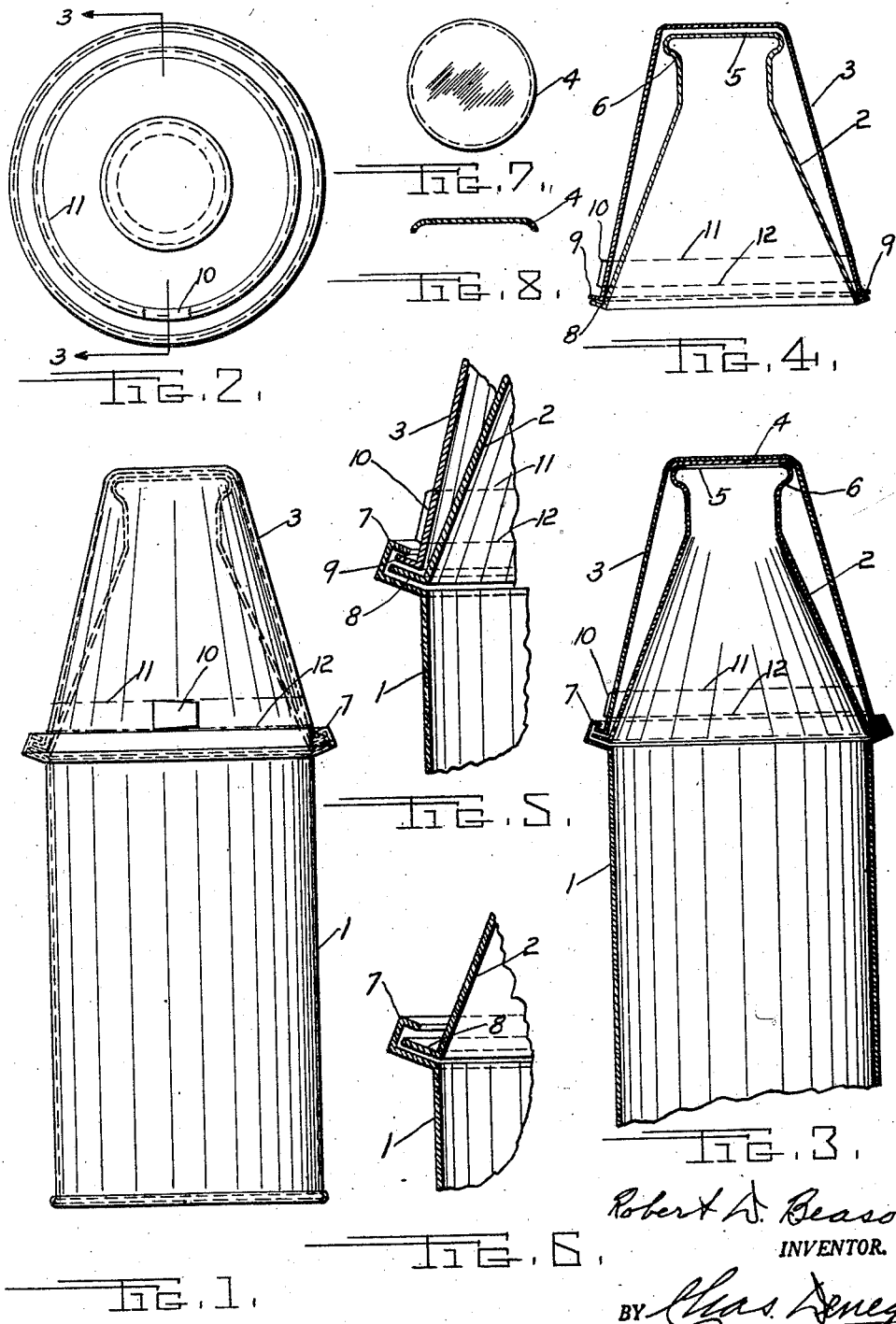
Robert D. Beason
INVENTOR.
BY Chas. Denegre
Attorney.

Patented Dec. 16, 1947

2,432,496

UNITED STATES PATENT OFFICE 2,432,496

SANITARY NURSING CONTAINER

Robert D. Beason, Birmingham, Ala.

Application June 15, 1945, Serial No. 599,687

2 Claims. (Cl. 215—11)

This invention relates to baby nursing and has for its main object to provide a sanitary seal for use on a container of artificial milk previously prepared according to a formula. At the present time the general practice is to take a portion of milk from a sealed can, mix it according to a prescribed formula, and place it in a bottle for use by the baby. The present invention provides for the formula mixed milk to be placed in a can or similar container by the producer or manufacturer ready for use. The sealed portion of the container is made to be easily removed and a nursing nipple is then attached to the neck of the container and thus made ready for use by the baby. The contents may be heated by inserting the container in hot water rather than have to heat the milk and then pour same into a bottle.

Other advantages will appear from the drawing and description.

By referring to the drawing, part of this application, it will be observed that Fig. 1 is an elevational view of the assembled container; Fig. 2 is a top plan view of the container; Fig. 3 is a vertical center sectional view on line 3—3 of Fig. 2 with bottom portion of container omitted; Fig. 4 is a vertical center sectional view of the top portion of the container and sealing hood; Fig. 5 is an enlarged detail sectional view showing joints; Fig. 6 is an enlarged detail sectional view showing shoulder joint less the sealing hood; Fig. 7 is a plan view of the sealing gasket; Fig. 8 is a center sectional view of the sealing gasket.

Similar reference numerals refer to similar parts throughout the several views.

Again referring to the drawing in detail it will be seen that the device comprises a main container body 1 with a conical shaped upper portion 2 that is provided at its top with a flange 6 that is adapted for a nursing nipple to fit thereon. The mouth 5 of the container is adapted to be sealed with a suitable sanitary gasket 4 that is held tight in sealed position over the mouth by the hood 3 that fits over the gasket and the upper conical portion of the container. The lower edge 9 of the hood 3 is pressed into the shoulder seam 7 between the container portion edge 8 and the top edge of the shoulder seam 7 so as to make the joint completely sealed. The bottom portion of the hood 3 is provided with an opening strip having its edges 11 and 12 weakened by suitable indenture so as to be easily torn out by pulling a tab 10 integral with one end of the strip. The lower edge 12 of the opening strip is placed adjacent the shoulder joint so that the remaining portion of the hood 3 will be out of reach of baby fingers when the container is converted from a sealed sanitary container of the mixed formula to a nursing container with a nipple thereon. From the foregoing it will appear that the one container serves the double purpose of having a prescribed formula prepared by the milk producer ready for use, and by simply removing the sealed hood and retaining sanitary gasket and attaching a standard nursing nipple the container becomes ready for use by the baby.

I prefer to make the device of tin or similar material, but it may be made of any other material suited for the purpose. Also I prefer to make it round, but it may be made square or any other shape without departing from its main features.

While I have shown and described the preferred embodiment of my invention, I do not wish to limit same to the exact and precise details of structure, but reserve the right to make all modifications and changes so long as they remain within the spirit and scope of the following claims.

Having described my invention I claim:

1. A sealed container and feeder for baby nursing comprising: a main body, said body having an opening in its top, a flange around said opening, said flange being adapted for a nursing nipple to fit thereon, a sanitary gasket fitting on and closing said opening, a truncated cone shaped hood, said hood fitting over said gasket and the upper portion of said main body, the said hood being attached to said main body by an air tight seam, said hood retaining said gasket firmly sealed over said opening; an opening strip around the lower portion of said hood and integral therewith, a tab integral with one end of said opening strip, said tab being adapted for removing said opening strip by manual means; said container adapted for use as a feeder when said hood and gasket are removed.

2. A sealed container for baby nursing comprising: a main body, said body being substantially conically shaped with its top truncated, a flange integral with the top edge of said truncated body, said flange being adapted to retain thereon a nursing nipple; a sanitary gasket fitting over and closing the mouth of said truncated portion, a truncated cone shaped hood fitting over said gasket and the conically shaped portion of said container, a shoulder seam around said container main body, the bottom edge of said hood fitting into said shoulder seam and forming a sealed joint therein, said hood holding tight in sealed condition the said gasket upon the mouth of the container; an opening strip integral with the lower portion of said hood, a tab integral with one end of said opening strip, said strip being adapted to be torn off for removing said hood from the container.

ROBERT D. BEASON.

REFERENCES CITED

The following references are of record in the file of this patent:

UNITED STATES PATENTS

| Number | Name | Date |
|---|---|---|
| 2,006,045 | Hopkins | June 25, 1935 |
| 2,056,773 | Fabrice | Oct. 6, 1936 |
| 2,322,843 | Deane | June 29, 1943 |
| 2,365,585 | Paxman | Dec. 19, 1944 |